Feb. 24, 1970   E. T. LEWIS   3,496,711
ADJUSTABLE MEANS FOR COUNTERING THE CUTTING
REACTION TORQUE IN A LAWNMOWER
Original Filed June 21, 1965
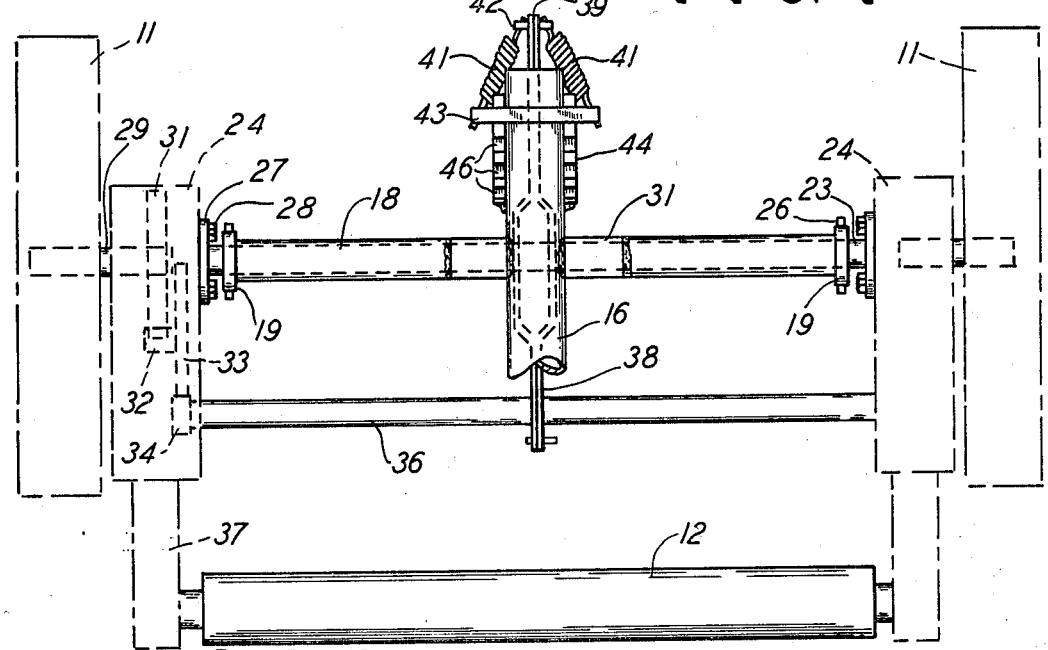
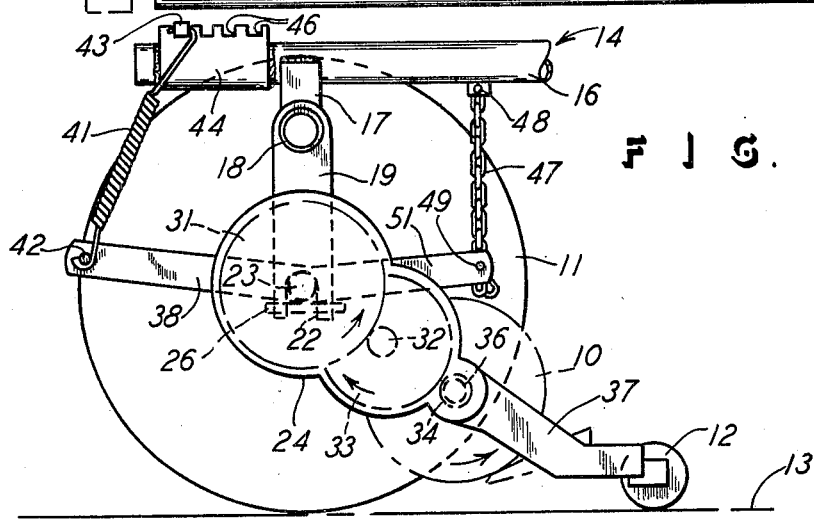
INVENTOR:
EVAN T. LEWIS
ATTORNEY 3,496,711
ADJUSTABLE MEANS FOR COUNTERING
THE CUTTING REACTION TORQUE IN
A LAWNMOWER
Evan T. Lewis, Racine, Wis., assignor to Jacobsen Manufacturing Company, Racine, Wis., a corporation of Wisconsin
Continuation of application Ser. No. 465,668, June 21, 1965. This application Oct. 25, 1968, Ser. No. 770,865
Int. Cl. A01d 53/02
U.S. Cl. 56—253
1 Claim

ABSTRACT OF THE DISCLOSURE

A lawnmower force-applying and adjustable means wherein a reel type of lawnmower includes drive gears extending from ground wheels to the reel. In counteraction to the torque acting on the mower in response to the cutting force exerted by the reel, a reaction spring is connected between the mower and the supporting frame to counter the cutting torque. The spring is connected to the frame through a plurality of selectable positions or stations, for altering the force that the spring exerts on the mower.

---

This application is a streamline continuation of patent application No. 465,668, filed June 21, 1965. now abandoned.

This invention relates to an adjustable means for countering the cutting reaction torque in a lawnmower.

In power-type lawnmowers which utilize cutting reels, and such type being either motor powered or the reel being powered by the mower's ground wheels, there is a cutting reaction at the reel. This reaction is considered in the nature of a torque which tends to raise the rear end of the mower and rotate it about the axis of the ground wheels. This is of course true in a reel-type mower which has a gear train or like power transmission extending from the driving ground wheels to the cutting reel. In the ground-wheel-powered-type mower, the mower is advanced over the ground to roll the wheels in the forward direction and thus through a power transmission from the wheels to the cutting reel, the latter is rotated for its cutting action. However, due to the reaction torque on the reel, it tends to rotate or orbit about the axis of the ground wheels and thus raise the rear end of the mower when the wheel axis and reel and supporting roller are arranged in that order from front to rear in the mower.

Accordingly, it is desirable to resist the tendency of the mower to raise at the rear end, since such raising will obviously affect the resulting cut of the grass as the rear roller will bounce or even rise permanently off the ground. Of course, it is the orientation of the mower between the forwardly located ground wheels and the rearwardly located roller that determines the elevation of the cutting reel and thus the height and smoothness of the cut.

It is a general object of this invention to provide an improved adjustable means for countering the cutting reaction torque in a reel-type lawnmower. In accomplishing this particular object, it is also significant that the weight on the lawnmower is not increased to any significant amount, and thus the mower can still function at a desired weight and not unduly add to cost or complexity of the mower, as well as not adding to the ground impression left by the mower.

A more specific object of this invention is to provide an adjustable force-applying means for resisting cutting reaction in a reel-type mower, and to do so in a manner which is susceptible to easy and ready adjustment by the operator without the use of any tools or the like. Further, it is significant that the operator can readily determine the adjusted position that he has set in the mower, since the adjusting means lends itself to showing the operator what adjusted position he has selected. Also, the means employed here in is inexpensive in manufacture and mainetnance, does not appreciably add to the weight of the mower, and yet permits the mower to be fully operative on the ground without any loss in efficiency, and also permits the mower to be raised to a transport position. Still further, aforementioned objects can be accomplished without considerable modification of standard type lawnmowers utilizing transmissions or drives between the ground wheel or a driving motor and the cutting reel.

Other objects and advantages will become apparent upon reading the following description in light of the accompanying drawings, wherein:

FIG. 1 is a top plan view of a preferred embodiment of this invention and showing it related to a lawnmower with parts thereof indicated in dot-dash lines and with parts broke away.

FIG. 2 is a left side elevational view of FIG. 1 with the near ground wheel removed.

The mower is shown to be of a real-type having its cutting reel indicated in dot-dash lines in FIG. 2 and designated 10. Two spaced-apart ground wheels 11 and a rotatably mounted rear roller 12 provide the usual support for the mower on a ground line indicated 13 in FIG. 2. FIG. 1 shows the two wheels 11 in dot-dash lines, and these parts are of course conventional and readily understood in structure and arrangement by one skilled in the art.

In more detail, a supporting frame generally designated 14 is shown to include a push tube 16 which would of course be supported from a tractor or the like, (not shown) to move the mower over the ground. A depending yoke 17 is attached to the tube 16 and in turn has a tube 18 and two depending legs or sides 19, and the tube 18 is connected to the tube 16 by a connector 21 which is welded between the tubes or has any other conventional connection therebetween so that they form one rigid frame 14.

The lower ends of the yoke legs 19 have openings 22 which rotatably receive a cross tube or shaft 23 extending between the mower's gear cases 24 which are shown in dot-dash lines and are conventional members in mowers of this type. A pin or bolt 26 extends below the cross tube 23 to retain it in the legs 19 as shown.

Thus it will be apparent that any movement of the supporting frame 14, such as fore-and-aft movement or raising and lowering movement, will induce like motion in the lawn mower itself through the cross tube 23, except that the latter may rotate in its support as described and of course about its own axis.

The ends of the cross tube 23 have flanges 27 affixed thereto and secured to the respective gear cases 24 by means of bolts 28. It will therefore be understood that any rotation of the cross shaft or tube 23 about its own axis will induce like rotation in the gear cases 24 about that axis.

The wheels 11 drivingly connect to the gear cases 24 through a driving shaft 29 extending between the wheels 11 and into the gear cases 24. Forward rotation of the wheels 11 thus rotates the shaft 29 and a gear 31 affixed thereto. The gear 31 drives a pinion 32 and a gear 33 and another pinion 34 which is on the shaft 36 of the cutting reel 10. In this manner, the reel 10 is powered or driven by forward movement of the mower, that is, the rolling of the wheels 11 over the ground.

When the reel 10 encounters a resistance to rotation, such as is encountered in cutting grass, then it will be seen that the reel 10 has a tendency to orbit the axis of the ground wheels 11 in a counterclockwise direction with reference to FIG. 2. The adjustable means of this invention has the purpose of resisting this orbital tendency created by resistance to cutting.

The gears 31 through 34 constitute a gear train disposed within the gear cases 24. A bracket or the like 37 is affixed to the gear cases to extend rearwardly thereof and provide a support for the roller 12.

The adjustable force-applying means of this invention includes the bar 38 which is fixedly attached to the cross tube 23. Thus up-and-down movement of the front end 39 of the bar 38 will rotate the tube 23 and likewise rotate the gear case 24. Two tension springs 41 are attached between a pin 42 on the bar 38 and a bar 43 at the upper ends of the springs 41.

A member 44 is secured to the frame tube 16 and has a plurality of notches 46 along the upper end thereof. The bar 43 fits into the notches 46 and thus provides an anchor for the springs 41. The notches 46 are stations spaced in the fore-and-aft direction of the mower, and the upstanding pieces shown forming the notches 46 are abutments for the bar 43 and are faced rearwardly of the mower. It will further be noted that the notches 46 are in a plane or location rearward of the vertical plane passing through the lower anchor pin 42 for the springs 41. Thus movement of the spring bar 43 toward the rear or into notches 46 rearward of the shown location of the bar 43 will create greater tension in the springs 41. The spring tension causes the urging of rotation in the gear cases 24 and thus causes the selective forcing downwardly on the roller 12, as desired. Of course, the weight of the mower overbalanced rearwardly of the wheel axles 29 will also bear downwardly on the roller 12, but the spring tension will further force downwardly on the roller 12 to maintain the roller in a firm position with the ground as required according to cutting resistance and the tendency of the reel 10 to orbit the wheel axles 29.

Further, it will be understood that excessive tension in the springs 1 will actually raise the front end of the mower so that the ground wheels 11 will lose traction, such would be undesirable and therefore the adjusting tension on the springs 41 is important.

When the entire frame 14 is raised to place the mower in the transport position, a chain 47 is effective to raise the mower in its level position, or substantially level position, as the chain is connected between a pin 48 on the frame tube 16 and a pin 49 on the rear end 51 of the bar 38. The chain 47 is of course shown to have slack so that it will not interfere with the function of the spring adjusting means described when the mower is in the operating position shown.

What is claimed is:

1. In an adjustable force-applying means for a lawnmower of the powered type having two forwardly located ground wheels and a cutting reel rearward of the rotation axis of said wheels and a ground-engaging supporting roller rearward of said cutting reel and with drive means operatively connected to said cutting reel for rotating the latter, a mower supporting frame extending above and in the fore-and-aft direction of said mower, a member rotatably supported on said frame and extending therebelow in the fore-and-aft direction of said mower and having a connection point on the forwardly extending end of said member and being connected to said drive means to prevent the orbiting of the latter about said wheels, spring means operatively connected between said frame and said member and adapted to rotate the latter and said drive means in a direction to urge said roller downwardly, the improvement comprising said frame having a plurality of stations spaced therealong in the fore-and-aft- direction of said mower, and rearwardly of said connection point and at different distances from said connection point, a bar positioned above said frame and extending transverse thereto and horizontally extending parallel to the axis of rotation of said member on opposite sides of said frame and with said ends extending equi-distant on opposite sides of a vertical plane extending through said member and with said bar upwardly supported on said frame at a selected one of said stations, and said spring means being two tension springs with each connected at one end to said member at said connection point and at the other end to said opposite ends of said bar, said spring being extendable for selective positioning of said bar at said stations to selectively apply force to said drive means through said member and thereby control the downward force on said roller.

References Cited
UNITED STATES PATENTS

| | | | |
|---|---|---|---|
| 1,293,287 | 2/1919 | Worthington | 56—7 |
| 1,320,098 | 10/1919 | Sawtelle | 56—7 |
| 1,330,293 | 2/1920 | Worthington | 56—7 |
| 1,482,432 | 7/1922 | Hildebrand | 56—254 |
| 1,512,439 | 10/1924 | Worthington | 56—7 |
| 1,533,127 | 4/1925 | Masbruch | 5—249 |
| 1,607,378 | 11/1926 | Worthington | 56—7 |
| 1,687,422 | 10/1928 | Bensien | 172—265 X |

ANTONIO F. GUIDA, Primary Examiner

J. A. OLIFF, Assistant Examiner